June 10, 1947.  T. SIMPSON  2,421,810
INJECTOR FOR FUEL OR OTHER LIQUIDS
Filed Aug. 29, 1944  2 Sheets-Sheet 1

Inventor
Thomas Simpson
By Moses, Nolte, Crews & Berry
Attorneys

June 10, 1947. T. SIMPSON 2,421,810
INJECTOR FOR FUEL OR OTHER LIQUIDS
Filed Aug. 29, 1944 2 Sheets-Sheet 2

Inventor
Thomas Simpson
By Moses, Nolte, Crews & Berry
Attorneys

Patented June 10, 1947

2,421,810

UNITED STATES PATENT OFFICE 2,421,810

INJECTOR FOR FUEL OR OTHER LIQUIDS

Thomas Simpson, Kenilworth, England, assignor to H. M. Hobson Limited, London, England Application August 29, 1944, Serial No. 551,673
In Great Britain April 11, 1944

4 Claims. (Cl. 251—138)

1

This invention provides an injector which, although primarily intended for use as a means for supplying additional fuel to an engine for the purpose of acceleration, the fuel being controlled both in respect of time and quantity, is nevertheless of general application to any case in which it is desired to deliver a controlled amount of liquid in a given time. The only requirement in any of these cases is that the unit be connected to a source of liquid under pressure.

The injector according to the invention comprises a casing divided into front and rear chambers, an inlet for admitting liquid under pressure into the rear chamber, a restricted outlet for permitting egress of liquid from the front chamber, a spring-loaded piston or diaphragm in the rear chamber, an axially movable valve for controlling the flow of liquid from the rear chamber to the front chamber, the spring normally holding an abutment carried by the piston or diaphragm in sealing engagement with the valve to cut off the supply of liquid to the front chamber and serving, on movement of the valve away from the abutment, to displace the piston or diaphragm to reseal the valve, and an orifice in the rear chamber for permitting restricted flow only of liquid from front to rear of the piston or diaphragm. When therefore the valve is moved axially away from the piston or diaphragm, liquid is allowed to flow into the front chamber and out of it through the restricted outlet, the flow continuing until the spring has moved the piston or diaphragm forward sufficiently to close the valve again, and the duration of flow being determined by the size of the orifice in the rear chamber.

Two forms of injector according to the invention suitable for supplying additional fuel to an aircraft engine for purposes of acceleration, will now be described in further detail, by way of example, with reference to the accompanying drawings, in which—

Figure 1:
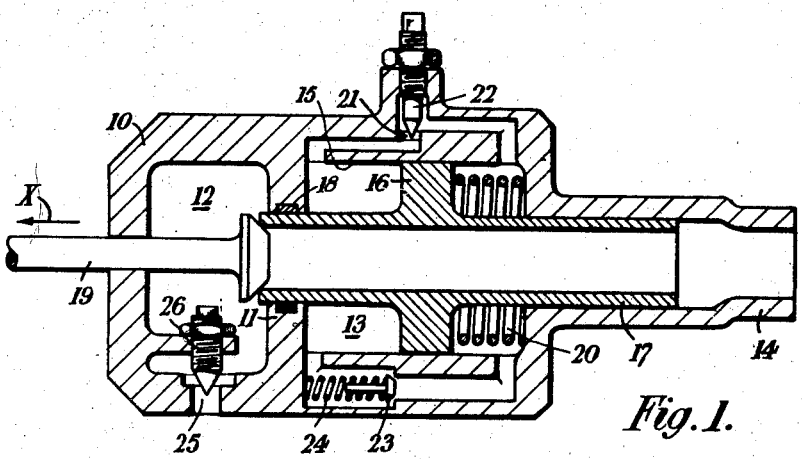
Figure 2:
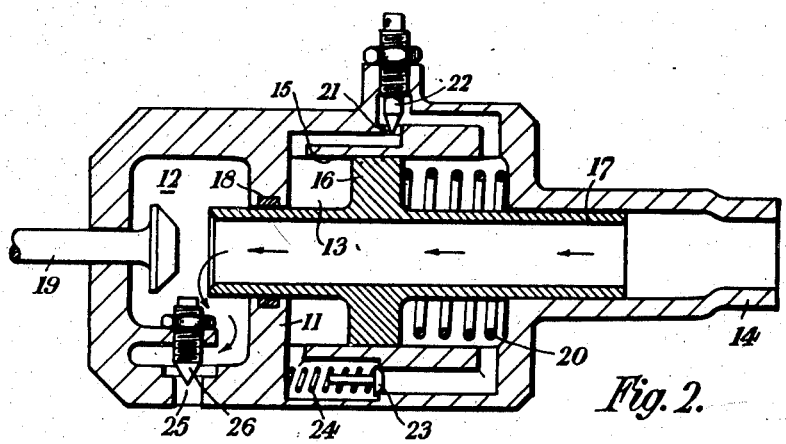
Figure 3:
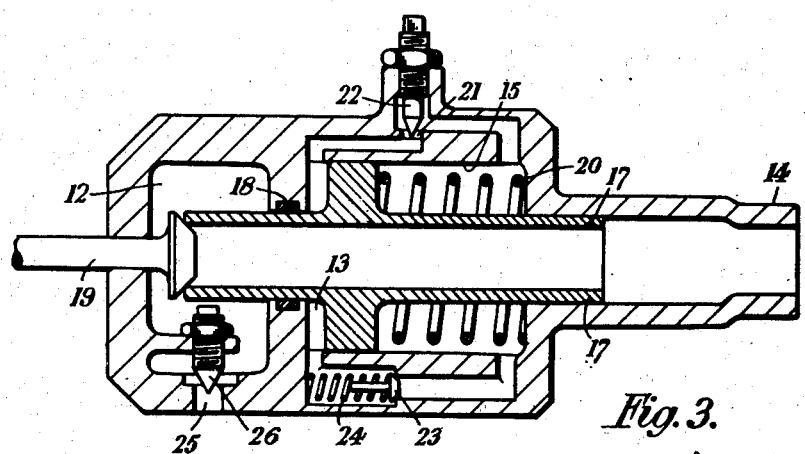
Figure 4:
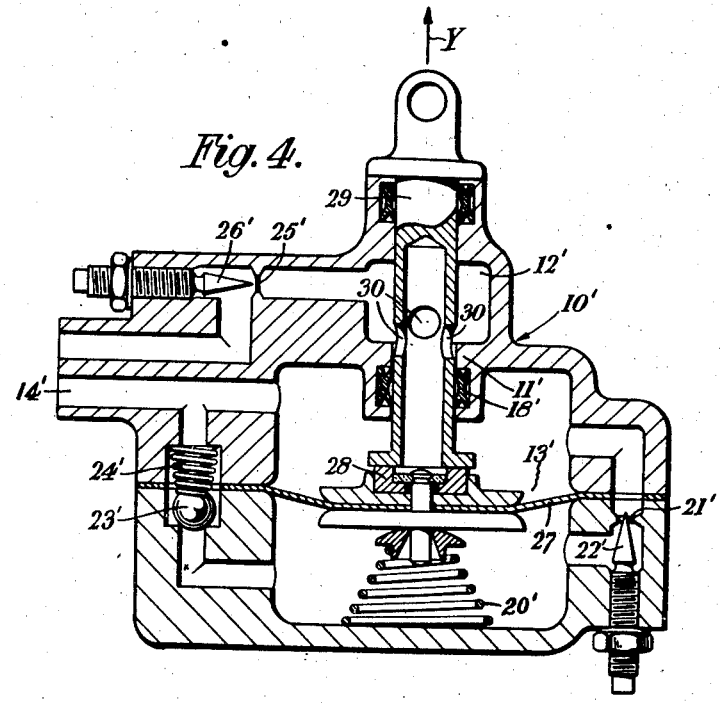
Figure 5:
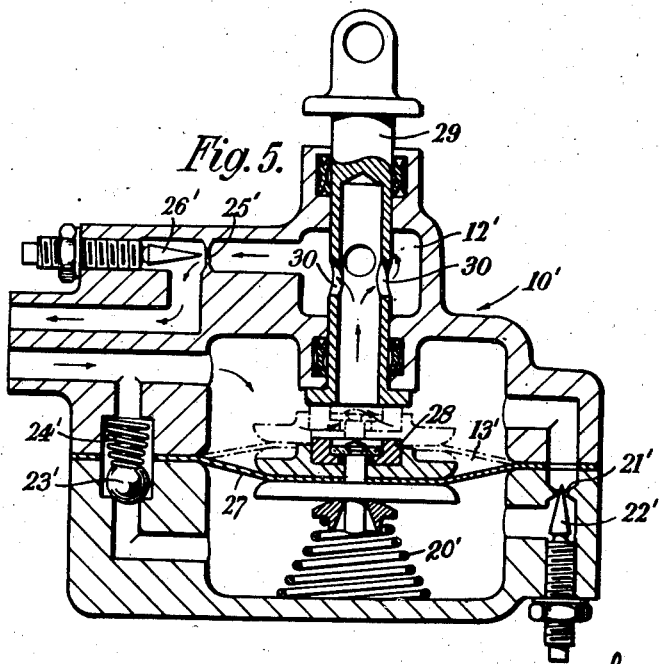

Figs. 1, 2 and 3 are diagrammatic sectional views of the first embodiment, showing the parts in successive positions which they occupy during acceleration of the engine, and Figs. 4 and 5 are diagrammatic sectional views of the second embodiment, corresponding respectively to Figs. 1 and 2.

Like reference characters designate like parts throughout the figures.

The injector shown in Figs. 1-3 comprises a casing 10 divided, by a partition 11, into front and rear chambers 12, 13 respectively. The rear chamber 13 has a rearwardly extending inlet 14 for connection to a source of fuel under pressure,

2 and in the rear chamber is mounted a fixed bore 15 in which slides a piston 16 mounted on a hollow piston rod 17, the rear end of which is a close fit in the inlet 14 and the front end of which projects into the front chamber 12 through a bore in the partition 11, sealed by a packing 18. In the front chamber 12 is an axially movable valve 19 which is linked to the pilot's throttle lever (not shown) so as to receive forward movement therefrom, in the direction indicated by the arrow X, when the pilot's lever is moved to open the throttle. A compression spring 20 behind the piston 16 urges the latter forwardly to bring the forward end of the piston rod 17 into sealing engagement with the valve 19 as shown in Fig. 1, thus cutting off the fuel supply.

The rear chamber 13 is filled with fuel at relatively low pressure, and an orifice 21, the area of which is adjustable by means of a needle valve 22, permits of a restritced flow only of fuel from front to rear of the piston 16. A non-return valve 23 loaded by a spring 24 permits of unrestricted flow of fuel from rear to front of the piston 16. An outlet orifice 25, adjustable in area by means of a needle valve 26, permits of restricted flow of fuel from the front chamber 12 to the engine induction system.

On movement of the pilot's lever to accelerate, the valve 19 is moved away from the piston rod 17, as shown in Fig. 2, and fuel will be free to flow from the hollow piston rod into the front chamber 12 and out of it through the restricted outlet 25, and the flow will continue until the spring 20 has moved the piston rod 17 forward sufficiently to close it against the valve (see Fig. 3), liquid being displaced from front to rear of the piston through the restricted orifice 21 in the rear chamber.

When the pilot moves his throttle lever to close the throttle again, he will displace the valve 19 and piston rod 17 rearwardly from the position of Fig. 3, and the travel of fuel from the rear to the front of the piston 16 is accomplished quickly via the non-return valve 23.

The amount of fuel injected into the engine induction system when the pilot opens his throttle fully is controlled for time of duration by the orifice 21 in the rear chamber and for quantity per unit time by the orifice 25 in the front chamber. When the pilot moves his throttle lever less than the full amount of its travel, a proportionally smaller amount of fuel is injected.

In the alternative arrangement shown in Figs. 4 and 5, the rear chamber 13' is filled with fuel under pressure admitted through the inlet 14', and the flow of fuel to the front chamber is controlled by a tubular piston valve 29 linked to the pilot's throttle lever so as to move in the direction of the arrow Y when the pilot's lever is moved to open the throttle. The piston of the previous embodiment is replaced by a diaphragm 27 carrying a rubber seating 28 which is normally maintained by the spring 20' (see Fig. 4) in sealing engagement with the valve 29, the axis of which is at right angles to the plane of the diaphragm, thus cutting off the supply of fuel.

When however the pilot moves his lever to open the throttle, the valve 29 is lifted away from the seating 28 (see Fig. 5), and fuel is able to flow from the rear chamber 13' into the hollow interior of the valve 29, thence through openings 30 in the valve to the front chamber and so to the induction system through the restricted outlet 25'. Flow continues until the spring 20' has displaced the diaphragm 27 sufficiently to bring the seating 28 once more into sealing engagement with the valve.

The time of flow is determined by the time taken by the diaphragm to close the open end of the tubular valve 29, fuel flowing from the front to the rear of the diaphragm 27, as the latter is moved forward by its spring 20', through the adjustable orifice 21' in the rear chamber. As before, a non-return valve 23' is provided in the rear chamber to allow of quick flow of fuel from rear to front of the diaphragm when the pilot closes the throttle.

What I claim as my invention and desire to secure by Letters Patent is:

1. An accelerating device, operable to deliver a controlled amount of liquid in a given time, and comprising a casing divided into front and rear chambers, an inlet for admitting liquid under pressure to the rear chamber, a restricted outlet for permitting egress of liquid from the front chamber, a pressure sensitive device movably mounted in the rear chamber, an abutment carried thereby, an axially movable valve for controlling the flow of liquid from the rear to the front chamber, a spring associated with the pressure sensitive device for urging the abutment into sealing engagement with the valve and serving, on movement of the valve away from the abutment, to displace the pressure sensitive device so as to reseal the valve, an orifice in the rear chamber for permitting restricted flow only of liquid from front to rear of the pressure sensitive device, and means operable from the exterior of the casing to vary the effective area of said orifice.

2. An accelerating device, operable to deliver a controlled amount of liquid in a given time, and comprising a casing divided into front and rear chambers, an axially movable valve in the front chamber, a piston in the rear chamber which is movable therein to displace liquid from one end of the rear chamber to the other, said piston having a hollow piston rod which is coaxial with the valve, which constitutes an inlet for admitting liquid under pressure to the device and which extends forwardly into the front chamber, a spring which urges the forward end of the hollow piston rod into sealing engagement with the valve to prevent liquid from flowing from the piston rod to the front chamber, a restricted outlet for permitting egress of liquid from the front chamber, an orifice in the rear chamber for permitting restricted flow only of liquid from front to rear of the piston, and a needle valve adjustable from the exterior of said casing to vary the effective area of said orifice.

3. An accelerating device, operable to deliver a controlled amount of liquid in a given time, and comprising a casing divided into front and rear chambers, an inlet for admitting liquid under pressure into the rear chamber, a restricted outlet for permitting egress of liquid from the front chamber, a diaphragm movably mounted in the rear chamber, a tubular axially movable valve for controlling the flow of liquid from the front chamber to the rear chamber, the axis of said valve extending at right angles to the plane of the diaphragm, an abutment on the diaphragm, a spring for urging said abutment into sealing engagement with the valve to prevent liquid from flowing through the tubular valve to the front chamber, an orifice in the rear chamber for permitting restricted flow only of liquid from front to rear of the diaphragm, and a needle valve adjustable from the exterior of said casing to vary the effective area of said orifice.

4. An accelerating device, operable to deliver a controlled amount of liquid in a given time, and comprising a casing divided into front and rear chambers, an inlet for admitting liquid under pressure to the rear chamber, a restricted outlet for permitting egress of liquid from the front chamber, a pressure sensitive device movably mounted in the rear chamber, an abutment carried thereby, an axially movable valve for controlling the flow of liquid from the rear to the front chamber, a spring associated with the pressure sensitive device for urging the abutment into sealing engagement with the valve and serving, on movement of the valve away from the abutment, to displace the pressure sensitive device so as to reseal the valve, an orifice in the rear chamber for permitting restricted flow only of liquid from front to rear of said pressure sensitive device, a conduit connecting opposite ends of the rear chamber, and a non-return valve in said conduit for permitting unrestricted flow of liquid from rear to front of said pressure sensitive device.

THOMAS SIMPSON.

REFERENCES CITED

The following references are of record in the file of this patent:

UNITED STATES PATENTS

| Number | Name | Date |
|---|---|---|
| 1,994,944 | Cole | Mar. 19, 1935 |
| 1,682,761 | Linga | Sept. 4, 1928 |
| 1,935,299 | Siegert | Nov. 14, 1933 |
| 1,291,609 | Nichols | Jan. 14, 1919 |
| 2,092,685 | Viel | Sept. 7, 1937 |
| 2,025,504 | Geiger | Dec. 24, 1935 |
| 30,462 | Carr | Oct. 23, 1860 |

FOREIGN PATENTS

| Number | Country | Date |
|---|---|---|
| 474,649 | France | Dec. 15, 1914 |